S. Anderson,
Saw.
N° 77,439. Patented May 5, 1868.
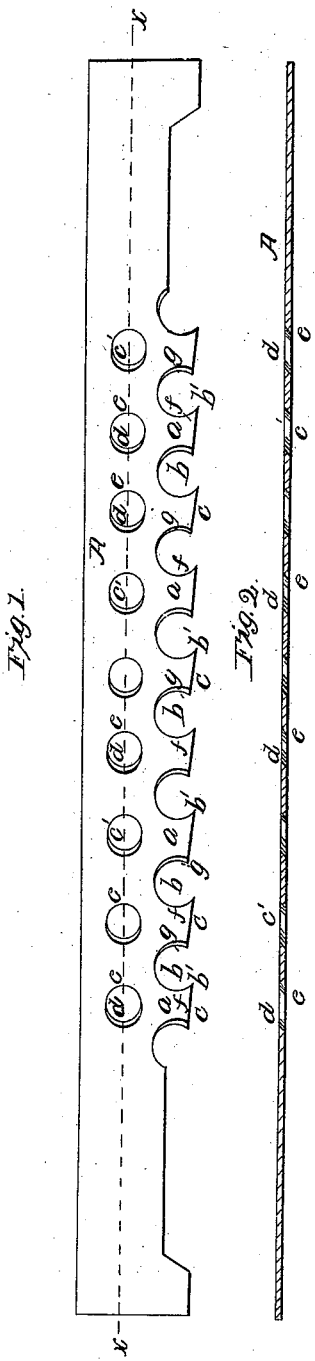
Witnesses:
Thos Twseke
Wm Frewn
Inventor:
S Anderson
Per Munn &
Attorneys

UNITED STATES PATENT OFFICE.

SOLOMON ANDERSON, OF WEST BURLINGTON, NEW YORK.

IMPROVEMENT IN SAWS.

Specification forming part of Letters Patent No. 77,439, dated May 5, 1868.

*To all whom it may concern:*

Be it known that I, SOLOMON ANDERSON, of West Burlington, in the county of Otsego and State of New York, have invented a new and useful Improvement in Reciprocating Saws; and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim and desire to have secured to me by Letters Patent.

This invention relates to a new and useful improvement in reciprocating saws; and it consists in a peculiar construction of the teeth of the same, whereby the teeth are made to cut the wood after the manner of chisels, instead of scraping the same and tearing away the fiber, as is the case with the teeth of ordinary construction, which render the sawed lumber very rough and require a great expenditure of power in sawing.

In the accompanying sheet of drawings, Figure 1 is a side view of my invention; Fig. 2, a longitudinal section of the same, taken in the line $x\ x$, Fig. 1.

Similar letters of reference indicate like parts.

A represents the blade of a saw, constructed, as usual, of sheet-steel or steel plate, and having its teeth $a$ formed by cutting or punching holes $b$ in the front edge of the plate, said holes being the greater portion of a circle, as shown clearly in Fig. 1.

The teeth $a$ have their points or cutting-edges $b'$ of chisel form, and their faces or front sides, $c$, are slightly inclined, so that their lower or cutting edges, $b'$, will be a trifle in advance of their upper edges.

By this arrangement the teeth are made to cut like chisels, and with but a comparatively small expenditure of power, and leave the sawed lumber with a smooth surface.

In addition to this advantage attending the operation of the teeth I perforate the plate, about on a longitudinal central line, with circular holes $c'$, and have the upper edges of said holes beveled to form a cutting-edge, $d$, at one side of the saw-plate, and the lower edges of the holes beveled in the same direction, the two beveled surfaces being parallel with each other to form cutting-edges $e$ at the opposite side of the saw-plate.

The holes $b$, which form the teeth $a$ of the saw, are also beveled in a similar manner to form upper and lower cutting-edges, $f\ g$. By this means the upper cutting-edges, $d$, of the holes $c'$ and the upper cutting-edges, $f$, of the holes $b$ will plane or smooth the wood at one side of the saw-kerf as the saw descends, while the lower cutting-edges, $e\ g$, of said holes will plane or smooth the wood at the opposite side of the kerf as the saw ascends.

It will be seen that the saw-teeth $a$ may be filed and kept in perfect working order, all that is required to sharpen the saw being the drawing of a file over their face sides $c$.

When the saw requires "gumming," which is not very often, it may be readily done by cutting the holes $b$, by means of a round file or rotary cylindrical cutter.

Having thus described my invention, I claim as new and desire to secure by Letters Patent—

The perforations $c'$ in the saw-plate A, having upper and lower cutting-edges, $d\ e$, and used either with or without the cutting-edges $f\ g$ of the holes $b$, substantially as and for the purpose set forth.

The above specification of my invention signed by me this 7th day of May, 1867.

SOLOMON ANDERSON.

Witnesses:
 J. A. SERVICE,
 ALEX. F. ROBERTS.